United States Patent [19]

Nash

[11] Patent Number: 4,464,728
[45] Date of Patent: Aug. 7, 1984

[54] CHARGE COUPLED DEVICE RIPPLE ADDER WITH NEARLY INSTANTANEOUS CARRY PROPAGATION

[75] Inventor: James G. Nash, Los Angeles, Calif.

[73] Assignee: Hughes Aircraft Company, El Segundo, Calif.

[21] Appl. No.: 303,332

[22] Filed: Sep. 18, 1981

[51] Int. Cl.$^3$ .............................................. G06F 7/50
[52] U.S. Cl. ................................................ 364/786
[58] Field of Search ................ 364/786, 784, 768, 862

[56] References Cited

U.S. PATENT DOCUMENTS

| 3,932,734 | 1/1976 | Parsons | 364/786 |
| 4,032,767 | 6/1977 | Lagnado | 364/862 |
| 4,135,104 | 1/1979 | Allen | 307/221 D |
| 4,170,041 | 10/1979 | Handy et al. | 364/784 |

OTHER PUBLICATIONS

Zimmerman et al., "Charge Coupled Device Digital Arithmetic Functions: Experimental Results", *Third International Conference on Charge Coupled Devices*, University of Edinburgh, 1976, pp. 190–196.
Handy, "Use of CCD in the Development of Digital Logic", *IEEE Trans. on Electron Devices*, vol.-24, No. 8, Aug. 1977, pp. 1049–1061.

*Primary Examiner*—David H. Malzahn
*Attorney, Agent, or Firm*—David W. Collins; Russell B. Miller; A. W. Karambelas

[57] ABSTRACT

A ripple adder is implemented as a charge coupled device in such a manner that each carry bit propagates between succeeding full adder stages substantially simultaneously as each stage computes the sum of its two bits, so that the addition in each full adder stage may be carried out in parallel rather than in succession. The $i^{th}$ one of the CCD full adder stages includes charge transfer means for receiving two bits of charge, namely the $i^{th}$ bits of the two n-bit words which are to be summed. First and second charge storage means are provided, each having the capacity to store one bit of charge only, so that excess charge will cause an overflow. Means for sensing overflow charge stored in the second charge storage means is connected to a carry bit charge injector in the $i^{th}+1$ adder stage.

5 Claims, 3 Drawing Figures

CHARGE COUPLED DEVICE RIPPLE ADDER WITH NEARLY INSTANTANEOUS CARRY PROPAGATION

TECHNICAL FIELD

This invention is a ripple adder useful in, for example, the arithmetic logic unit of a central processor.

BACKGROUND ART

Ripple adders of the type now used in arithmetic logic units typically include a series of full adder stages arranged in serial succession. The ripple adder computes the sum of two words by individually computing the sums of each corresponding bit pair of the two words beginning with the least significant bit and progressing to the most significant bit. Typically, each full adder stage must decide whether or not to generate a carry bit which is summed into the next successive full adder stage. Accordingly, the speed of such a ripple adder is significantly limited because the addition must be carried out in each full adder stage successively so that the carry bit from the preceding stage is ready when the next full adder stage computes its sum. For example, assuming that only one clock period is required to transfer the carry bit between succeeding stages, the addition of two eight-bit words would require a minimum of eight clock periods before all eight bits were summed.

In the growing technology of very high-speed integrated circuits, a primary goal is to raise the speed of such devices as arithmetic logic units, which requires that the speed of ripple adders used in such logic units be increased.

SUMMARY OF THE INVENTION

In this invention, a ripple adder is implemented as a charge coupled device in such a manner that each carry bit propagates between succeeding full adder stages substantially simultaneously as each stage computes the sum of its two bits, so that the addition in each full adder stage may be carried out in parallel rather than in succession. As a result, the addition of two n-bit words in a charged couple device (CCD) ripple adder of this invention may be accomplished in one clock period, thus providing an approximately n-fold increase in adder speed. Thus, this invention overcomes the limitations of the prior art which required that the addition be carried out in serial succession in each of the full adder stages rather than in parallel simultaneously.

In this invention, an n-bit ripple adder comprises n full adder stages implemented as charge coupled devices. The $i^{th}$ one of the CCD full adder stages may receive two bits of charge, namely the two corresponding $i^{th}$ bits from the two n-bit words which are to be summed. First and second charge storage means are provided, each having the capacity to store one bit of charge only, so that excess charge will cause an overflow. Means for sensing overflow charge stored in the second charge storage means is connected to a charge injector in the $i^{th}+1$ adder stage. If each bit to be added in the $i^{th}$ full adder stage is equal to one, each representing one charge packet, then the first charge storing means receives a total of two charge packets, causing one bit of charge to overflow into the second charge storage means. This overflow is immediately detected by the charge sensing means, causing the charge injector of the $i^{th}+1$ full adder stage to inject one charge packet, representing the carry bit, into the corresponding first charge storage means of the $i^{th}+1$ full adder stage.

Thereafter, the sum from each full adder stage is read out simultaneously as follows: if no charge overflow has occurred between the first and second charge storage means, the overflow charge sensing means permits the charge stored in the first charge storage means to be read out directly (as either a one representing a full charge packet, or a zero representing an empty bucket of charge). On the other hand, if a charge overflow has occurred between the first and second charge storage means, the overflow charge sensing means prevents charge from being read out from the first charge storage means so that the one bit of overflow charge stored in the second charge storage means is read out as a "one", or a single bucket of charge.

The ripple adder is then prepared for the next computation by emptying the first and second charge storage means and replenishing with charge all of the carry bit charge injector means in the n full adder stages.

The speed of the ripple adder of this invention is limited by the charge transfer speed of the carry bit through the n full adder stages, which in turn is limited by the carrier mobility in the substrate on which the charge coupled device ripple adder is implemented. However, the carrier mobility of the substrate is typically such that transfer or propagation of the carry bit through the n stages is so rapid (less than one clock period) that, for purposes of this description, it may be considered virtually instantaneous. This represents a vast improvement over the limitation of the prior art, which required typically n clock periods for the carry bit to propagate through the n full adder stages in serial succession.

DESCRIPTION OF THE DRAWINGS

The invention is best understood by reference to the accompanying drawings, of which:

FIG. 3 includes diagrams of time domain waveforms of four clock signals controlling the charge coupled device of FIG. 2, of which;

Line a is a diagram of the time domain waveform of the clock signal $\phi RST$;

Line b is a diagram of the time domain waveform of the clock signal $\phi DIFF$;

Line c is a diagram of the time domain waveform of the clock signal $\phi DUMP$; and Line d is a diagram of the time domain waveform of the clock signal $\phi W$.

DETAILED DESCRIPTION OF THE INVENTION

Figure 1:
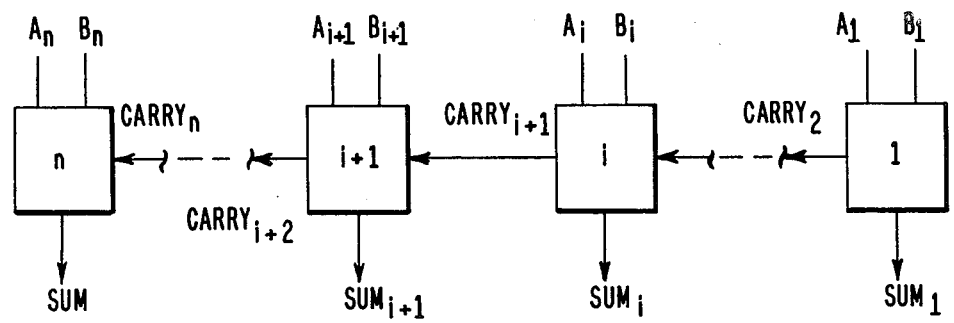
FIG. 1 is a block diagram illustrating a ripple adder of the type well-known in the prior art.

Referring to FIG. 1, two n-bit words A and B are added together in a ripple adder comprising a serial succession of n full adders, 1 through n, in which the $i^{th}$ adder stage receives the two corresponding $i^{th}$ bits $A_i$, $B_i$ from the two words A and B and computes the sum bit $SUM_i$ and computes the carry bit ($CARRY_{i+1}$) which is then input to the next full adder stage $i+1$. Transfer of the $CARRY_{i+1}$ bit from the $i^{th}$ full adder stage to the $i^{th}+1$ full adder stage has required, in the prior art, typically one clock period so that the operation of the $i^{th}+1$ full adder stage had to be delayed until the $CARRY_{i+1}$ bit was received, thus imposing a significant delay.

Figure 2:
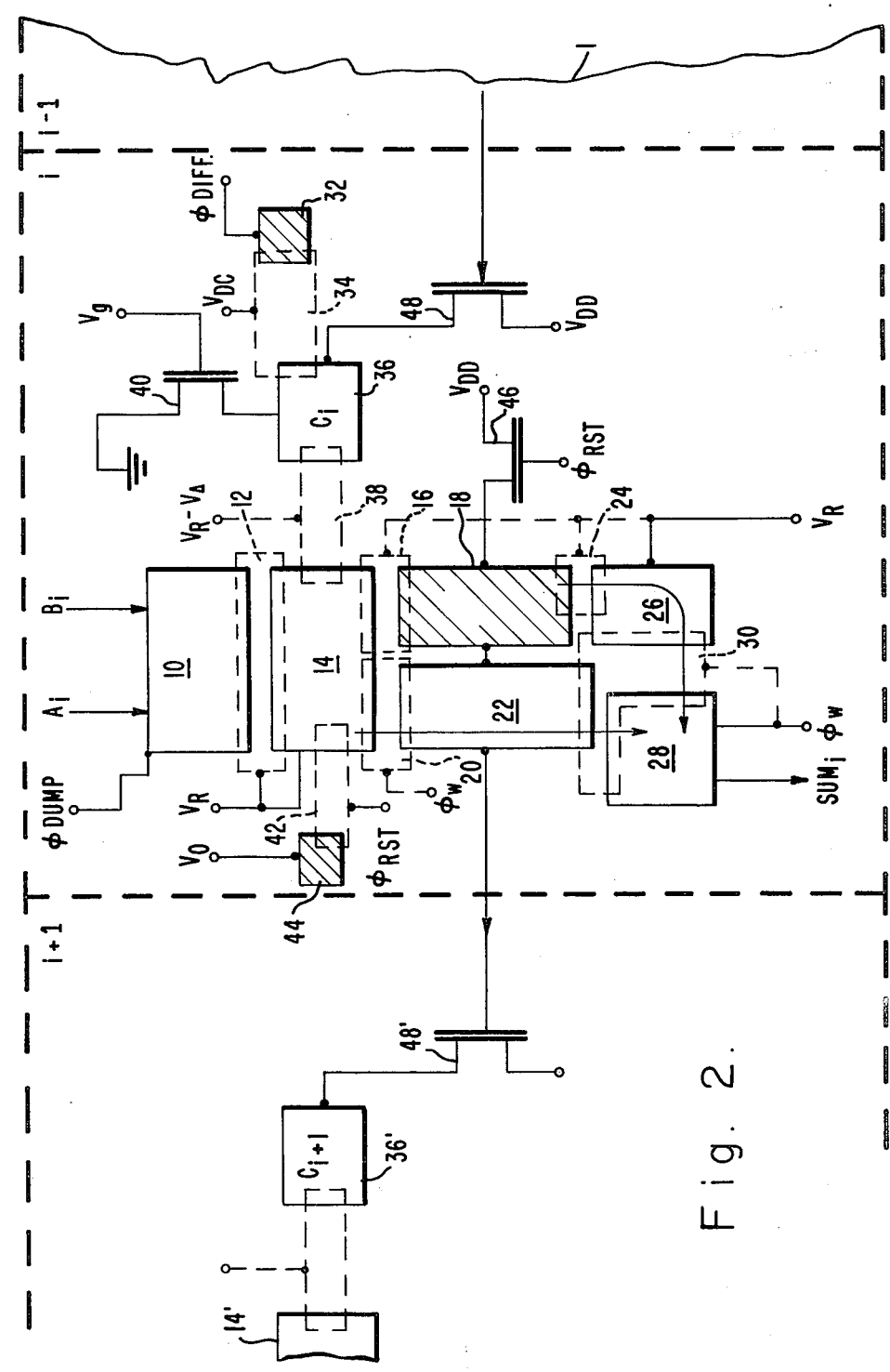
FIG. 2 is a simplified block diagram illustrating two adjacent full adder stages of the charge coupled device ripple adder of the present invention.

The invention is illustrated in the simplified block diagram of FIG. 2, showing the $i^{th}$ and $i^{th}+1$ full adder stages corresponding to FIG. 1. Each full adder stage in the invention is implemented in a very high speed integrated circuit as a charge coupled device on the same substrate 1 and includes means not shown for storing charge packets representing each of the addend bits $A_i$, $B_i$, $A_{i+1}$, $B_{i+1}$, etc. The device of FIG. 1 may be formed either with Schottky barrier electrodes if the substrate 1 is gallium arsenide, or with insulated double level polycrystalline silicon electrodes if the substrate 1 is silicon. If the latter obtains, then the solid line electrodes of FIG. 1 are the first level electrodes (namely, those closest to the substrate 1) while the dashed-line electrodes are the second level electrodes (namely, those higher above the substrate 1). A dump gate 10 is a first level electrode formed over the substrate 1 and is connected to receive a clock signal $\phi$DUMP. The dump gate 10 controls the transfer of the addend charge packets representing the addend bits $A_i$, $B_i$, into a first charge storage means formed as a surface potential well in the substrate 1 by a second level electrode 12 and a first level electrode 14, both being located over the substrate 1 and connected to a constant voltage source $V_R$.

A second charge storage means is formed in the substrate 1 by a second level electrode 16 located over the substrate 1 and a floating diffusion 18 formed in the substrate. A first read-out charge transfer path in the substrate 1 is controlled by a second level electrode 20 connected to receive a clock signal $\phi$W and a floating gate 22 formed as a first level electrode. The floating gate 22 is connected to the floating diffusion 18 as a means of sensing charge overflow from the first charge storage means formed beneath the electrode 14 into the second charge storage means comprising the floating diffusion 18. A second read-out charge transfer path is controlled by a second level electrode 24 and a first level electrode 26. Electrodes 16, 24 and 26 are all connected to the voltage source $V_R$. Read-out of the charge from the first and second read-out paths beneath the gates 22 and 26, respectively, is controlled by first and second level electrodes 28 and 30 respectively, both connected to receive a clock signal $\phi$W. Means, not shown, receive the charge transferred under the electrode 28 as the bit $SUM_i$.

The $i^{th}$ full adder stage also includes means for injecting a charge packet representing the carry bit $CARRY_i$ from the previous full adder stage $i-1$ (not shown) into the first charge storage means formed beneath the electrode 14. The carry bit charge injection means includes a Tompsett input comprising an input diffusion 32 formed in the substrate 1, an input gate 34 formed as a second level electrode connected to a constant voltage source $V_{DC}$, and a first level storage electrode 36 forming a surface potential well in the substrate 1 for storing the carry bit charge packet. A second level electrode 38 is connected to a voltage source $V_R-V_\Delta$ so as to form a potential barrier in the substrate 1 between the chsrge storage well located beneath the storage electrode 36 and the storage means in the substrate 1 formed beneath the electrode 14. The potential $V_R-V_\Delta$ is selected so that a suitable surface potential barrier is formed in the substrate 1 beneath the electrode 38, in a manner well-known to those skilled in the art. The storage gate 36 is connected to substrate ground through a field effect transistor 40 having its gate connected to a gate voltage source $V_G$.

Charge stored in the first charge storing means beneath the electrode 14 is periodically removed by means of a reset electrode 42 connected to receive a clock signal $\phi$RST and an output diffusion 44 connected to a voltage source $V_O$. The voltage $V_O$ is selected so that the output diffusion 44 forms an attractive repository for the removed charge transferred beneath the electrode 42.

Charge is periodically emptied from the floating diffusion 18 through a field effect transistor 46 connected to a drain voltage supply $V_{DD}$, the transistor 46 having its gate connected to receive a clock signal $\phi$RST.

Transfer of the carry bit charge packet stored beneath the electrode 36 into the first charge storage means formed beneath the electrode 14 is controlled by means of a field effect transistor 48. The storage gate 36 is connected to the drain voltage supply $V_{DD}$ across the source and drain of the transistor 48. The gate of the transistor 48 is connected to the floating gate of the previous full adder stage. Thus, FIG. 2 shows that the gate of transistor 48' of the $i^{th}+1$ full adder stage is connected to the floating gate 22 of the $i^{th}$ full adder stage. From the foregoing, it should be apparent to the skilled worker that the propagation of the carry bit from the $i^{th}$ stage to the $i^{th}+1$ stage is limited only by the mobility of the charge carriers and the transfer efficiency in the underlying substrate 1.

The device of FIG. 2 is preferably formed as an n-channel charge coupled device on a p-type substrate. The substrate may be formed of gallium arsenide and each of the electrodes may be a Schottky barrier electrode. Preferably, the substrate is p-type silicon and each of the electrodes is polycrystalline silicon separated from the silicon substrate 1 by an insulating layer such as silicon dioxide or silicon nitride.

Operation of the charge coupled device ripple adder of FIG. 2 will now be described by simultaneous reference to the timing diagrams of FIG. 3. At time $t_1$, the clock signal $\phi$RST is pulsed positively, thus creating an attractive potential well beneath the electrode 42 while at the same time turning on the transistor 46. Accordingly, whatever charge was stored in the first and second charge storage means formed in the substrate 1 beneath the electrode 14 and in the diffusion 18, respectively, is emptied to the output diffusion 44 and to the voltage source $V_{DD}$, respectively. Thereafter, at time $t_2$ the clock signal $\phi$RST is turned off. At $t_3$ the clock signal $\phi$DIFF is pulsed negatively so that charge is transferred from the input diffusion 32 and beneath the input gate 34 so as to fill the substrate surface potential well formed beneath the storage electrode 36. Afterwards the clock signal $\phi$DIFF is turned off at time $t_4$. At time $t_5$, the clock signal $\phi$DUMP is pulsed positively so that the charge packets representing the bits $A_i$ and $B_i$ are transferred together from the external storage means (not shown) into the first charge storage means formed beneath the electrode 14. The clock signal $\phi$DUMP is then turned off at time $t_6$.

At this time, one of several events may occur. If $A_i$ and $B_i$ are both logic zeroes, then each will be represented by an empty bucket of charge, so that no charge will be transferred beneath the storage electrode 14. If either $A_i$ or $B_i$ is a logic 1 while the other is a logic 0, then a single bucket of charge will be transferred and stored beneath the electrode 14. However, if both $A_i$ and $B_i$ are logic ones, then two buckets of charge will be transferred beneath the storage electrode 14, causing one bucket of charge to overflow beneath the gate 16 into the floating diffusion 18. This latter occurrence causes a negative potential to be applied to the floating gate 22 in the full adder stage i, thus blocking direct charge flow between the substrate regions underlying the storage gate 14 and the read-out gates 28 and 30. Simultaneously, a relatively negative potential is applied to the gate of the transistor 48' of the next succeeding full adder stage i+1, instantaneously injecting the carry bit charge packet stored beneath the storage electrode 36' of the $i^{th}+1$ stage into the first storage means formed in the substrate 1 beneath the storage electrode 14' of the $i^{th}+1$ stage.

Overflow may also occur in the $i^{th}$ full adder stage if the previous full adder stage i−1 (not shown) has caused the carry bit charge packet stored beneath the electrode 36 to be injected beneath the storage electrode 14 in the manner just described in connection with the i+1 full adder stage. In this event, if either $A_i$ or $B_i$ is equal to 1, overflow will occur in the $i^{th}$ stage so that a carry bit effectively propagates from the $i^{th}-1$ full adder stage through the $i^{th}$ stage to the $i^{th}+1$ stage.

At time $t_7$ the clock signal $\phi W$ is turned on (pulsed positively). In the $i^{th}$ full adder stage, if no overflow has occurred into the floating diffusion 18, then whatever charge packet is stored in the first storage means formed beneath the electrode 14 is transferred beneath the electrode 20, beneath the floating gate 22 and beneath the electrode 30 into a read out charge storage well formed beneath the read out electrode 28. The charge so transferred will either correspond to a logic 1 (one full charge packet) or a logic 0 (no charge). A logic 1 will be read out in this case if one of the following occurs: only $A_i=1$; only $B_i=1$; or, the carry bit $CARRY_i$ stored beneath the electrode 36 has been dumped beneath the storage electrode 14 while $A_i$ and $B_i$ are equal to 0.

If both $A_i$ and $B_i$ are equal to 1, then one bucket of charge overflows from beneath the electrode 14, beneath the electrode 16 and into the floating diffusion 18, causing a carry bit to be propagated into the next full adder stage i+1 in the manner previously described. However, if both $A_i$ and $B_i$ are logic ones and the previous adder stage i−1 causes the carry bit $CARRY_i$ stored beneath the electrode 36 to be dumped beneath the electrode 14, then a total of three charge packets will be dumped beneath the electrode 14, so that two charge packets will overflow the barrier formed beneath the electrode 16 into the floating diffusion 18, again applying a negative potential to the floating gate 22 and generating a carry bit in the $i^{th}$ full adder stage, one of these two charge packets then overflowing from the floating diffusion 18 beneath the electrode 24 into a storage well formed in the substrate surface potential beneath the electrode 26.

At time $t_8$ the clock signal $\phi W$ is turned off, and the adder is ready for the next cycle which begins at time $t'_1$ when the clock signal $\phi RST$ is again turned on.

The charge overflow operation just described may be summarized as follows. If two charge packets have previously been dumped beneath the electrode 14, then, when the clock signal $\phi W$ is turned on, no charge is transferred into the storage well formed beneath the electrode 28. This is because the charge flow path beneath the floating gate 22 has been blocked by the negative potential applied to the gate 22 by the overflow charge residing in the floating diffusion 18, and so the storage well formed beneath the electrode 28 remains empty. On the other hand, if three charge packets previously have been dumped beneath the electrode 14, two of the charge packets overflow into the diffusion 18, one of the two packets then overflowing beneath the electrodes 24 and 26 so that the storage well formed beneath the electrode 26 is filled with one packet of charge. Then, in this latter case, when the clock signal $\phi W$ is turned on, the charge packet stored beneath the electrode 26 is transferred beneath the electrode 30 and to a storage surface potential well formed beneath the electrode 28.

The foregoing corresponds to the well-known algorithm of a binary adder stage: If only one of $A_i$, $B_i$ or $C_i$ is equal to 1, then $SUM_i=1$ and $CARRY_{i+1}=0$. If only two of $A_i$, $B_i$, $C_i$ equal 1, then $SUM_i=0$ and $CARRY_{i+1}=1$. If all three are equal to 1 ($A_i=B_i=C_i=1$), then $SUM_i=CARRY_{i+1}=1$.

Figure 3:
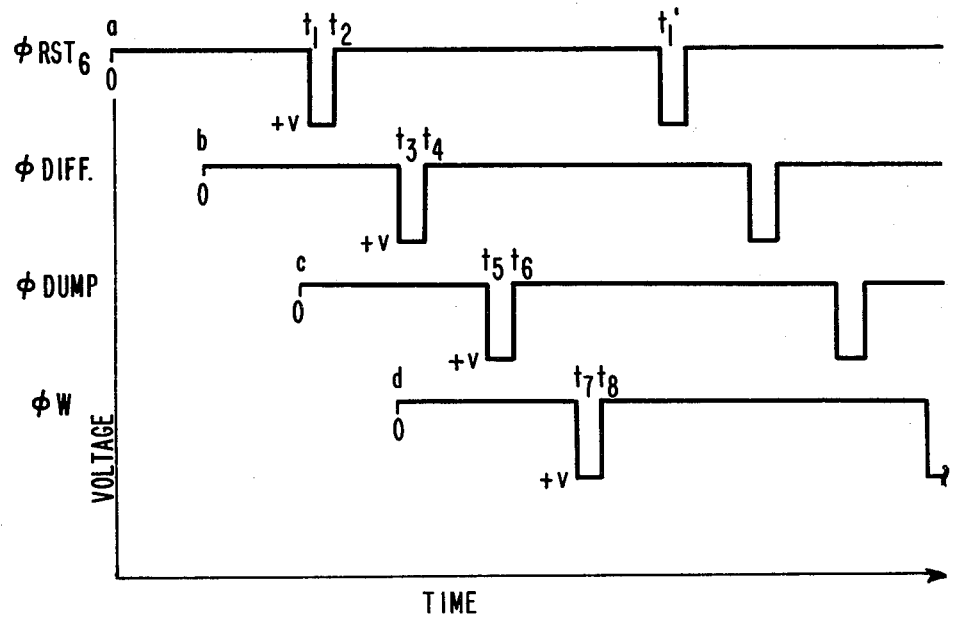

In summary, each of the adder stages 1 through n is operated by the clock signals illustrated in FIG. 3 simultaneously in parallel, thus providing a significant improvement in the speed and performance of the ripple adder of this invention over those of the prior art.

What is claimed is:

1. A charge coupled device ripple adder having a plurality of n stages, wherein each one of said stages adds two corresponding addend bits from two n-bit words and each one of said n stages is formed on a semiconductor substrate and comprises:

input charge storing means for receiving and storing charge packets representing each of said two corresponding addend bits, said input charge storing means having a charge storing capacity equivalent to one bit of charge;

carry bit charge injecting means for injecting a carry bit charge packet into said input charge storing means, said carry bit charge injecting means comprises an electrode overlying said substrate adjacent said input charge storing means, means for injecting charge into the portion of said substrate underlying said electrode, and a transistor having a source, drain, and gate, said source and drain connected between said electrode and a voltage source;

first overflow charge storing means for receiving charge from said input charge storing means, said first overflow charge storing means comprises a charge storing diffusion in said substrate, said first overflow charge storing means having a charge storing capacity equivalent to one bit of charge;

second overflow charge storing means for receiving charge from said first overflow charge storing means, said second overflow charge storing means having a charge storing capacity equivalent to one bit of charge, and said first overflow charge storing means diffusion located between said input charge storage means and said second overflow charge storing means;

sum bit charge storing means for receiving a sum bit charge packet from either one of said input charge storing means and said second overflow charge storing means in synchronism with a clock signal $\phi W$; and charge transfer blocking means for blocking the transfer of charge between said input charge storing means and said sum bit charge storing means, said charge transfer blocking means comprises a floating gate overlying said substrate and insulated therefrom and located between said input charge storage means and said sum bit charge storing means, said charge transfer blocking means floating gate being connected to said first overflow charge storing means charge storing diffusion to prevent charge transfer between said input charge storing means and said sum bit charge storing means whenever charge overflows into said first overflow charge storing means, said charge transfer blocking means floating gate also being connected to a carry bit charge injecting means transistor gate of a next succeeding stage so as to cause the carry bit charge injecting means of said next succeeding stage to inject a succeeding stage carry bit charge packet in response to an overflow of charge into said first overflow charge storing means, said carry bit charge injecting means transistor gate connected to a charge transfer blocking means floating gate of a next previous stage.

2. A charge coupled device ripple adder having a plurality of n stages, where each one of said stages adds two corresponding addend bits from two n-bit words and each one of said n stages is formed on a semiconductor substrate and comprises:

input charge storing means for receiving and storing charge packets representing each of said two corresponding addend bits, said input charge storing means having a charge storing capacity equivalent to one bit of charge, said input charge storing means comprises a storage electrode overlying said substrate, said storage electrode comprising a means for forming a surface potential well in an underlying portion of said substrate, said surface potential well having a charge storage capacity on the order of one bit of charge;

carry bit charge injecting means for injecting a carry bit charge packet into said input charge storing means;

first overflow charge storing means for receiving charge from said input charge storing means, said first overflow charge storing means having a charge storing capacity equivalent to one bit of charge;

second overflow charge storing means for receiving charge from said first overflow charge storing means, said second overflow charge storing means having a charge storing capacity equivalent to one bit of charge;

sum bit charge storing means for receiving a sum bit charge packet from either one of said input charge storing means and said second overflow charge storing means in synchronism with a clock signal $\phi W$;

charge transfer blocking means for blocking the transfer of charge between said input charge storing means and said sum bit charge storing means wherein said charge transfer blocking means is connected to said first overflow charge storing means to prevent charge transfer between said input charge storing means and said sum bit charge storing means whenever charge overflows into said first overflow charge storing means, said charge transfer blocking means also being connected to a carry bit charge injecting means of a next succeeding stage so as to cause the carry bit charge injecting means of said next succeeding stage to inject a succeeding stage carry bit charge packet in response to an overflow of charge into said first overflow charge storing means; and said input charge storing means further comprising a pair of barrier electrodes, a first barrier electrode of said pair of barrier electrodes overlays said input charge storing means storage electrode and said first overflow charge storing means wherein said first barrier electrode comprises a means for forming a surface potential barrier in said substrate between said input charge storing means and said first overflow charge storing means, and a second barrier electrode of said pair of barrier electrodes overlying said storage electrode and said charge transfer blocking means, said second barrier electrode connected to receive said clock signal $\phi W$.

3. The ripple adder of claim 2 further comprising a third barrier electrode partially overlying said sum bit charge storing means, said charge transfer blocking means and said second overflow charge storing means, said third barrier electrode being connected to receive said clock signal $\phi W$ so as to block charge flow from said second overflow charge storing means to said sum bit charge storing means in synchronism with said clock signal $\phi W$.

4. A charge coupled device ripple adder having a plurality of n stages, wherein each one of said stages adds two corresponding addend bits from two n-bit words and each one of said n stages is formed on a semiconductor substrate and comprises:

input charge storing means for receiving and storing charge packets representing each of said two corresponding addend bits, said input charge storing means having a charge storing capacity equivalent to one bit of charge;

carry bit charge injecting means for injecting a carry bit charge packet into said input charge storing means;

first overflow charge storing means for receiving charge from said input charge storing means, said first overflow charge storing means having a charge storing capacity equivalent to one bit of charge;

second overflow charge storing means for receiving charge from said first overflow charge storing means, said second overflow charge storing means having a charge storing capacity equivalent to one bit of charge;

sum bit charge storing means for receiving a sum bit charge packet from either one of said input charge storing means and said second overflow charge storing means in synchronism with a clock signal $\phi W$; and charge transfer blocking means for blocking the transfer of charge between said input charge storing means and said sum bit charge storing means wherein said charge transfer blocking means is connected to said first overflow charge storing means to prevent charge transfer between said input charge storing means and said sum bit charge storing means whenever charge overflows into said first overflow charge storing means, said charge transfer blocking means also being connected to a carry bit charge injecting means of a next succeeding stage so as to cause the carry bit charge injecting means of said next succeeding stage to inject a succeeding stage carry bit charge packet in response to an overflow of charge into said first overflow charge storing means; and resetting means for resetting the amount of charge storage in said input charge storing means and in said first overflow charge storing means in synchronism with a clock signal $\phi$RST, said resetting means comprising an output diffusion and a first reset gate adjacent said input charge storing means, said reset gate partially overlying said output diffusion and said input charge storing means and being connected to receive said clock signal $\phi$RST.

5. A charge coupled device ripple adder having a plurality of n stages, wherein each one of said stages adds two corresponding addend bits from two n-bit words and each one of said n stages is formed on a semiconductor substrate and comprises:

input charge storing for receiving and storing charge packets representing each of said two corresponding addend bits, said input charge storing means having a charge storing capacity equivalent to one bit of charge;

carry bit charge injecting means for injecting a carry bit charge packet into said input charge storing means;

first overflow charge storing means for receiving charge from said input charge storing means, said first overflow charge storing means having a charge storing capacity equivalent to one bit of charge;

second overflow charge storing means for receiving charge from said first overflow charge storing means, said second overflow charge storing means having a charge storing capacity equivalent to one bit of charge;

sum bit charge storing means for receiving a sum bit charge packet from either one of said input charge storing means and said second overflow charge storing means in synchronism with a clock signal $\phi$W;

charge transfer blocking means for blocking the transfer of charge between said input charge storing means and said sum bit charge storing means wherein said charge transfer blocking means is connected to said first overflow charge storing means to prevent charge transfer between said input charge storing means and said sum bit charge storing means whenever charge overflows into said first overflow charge storing means, said charge transfer blocking means also being connected to a carry bit charge injecting means of a next succeeding stage so as to cause the carry bit charge injecting means of said next succeeding stage to inject a succeeding stage carry bit in response to an overflow of charge into said first overflow charge storing means; and resetting means for resetting the amount of charge storage in said input charge storing means and in said first overflow charge storing means in synchronism with a clock signal $\phi$RST, said resetting means comprising a field effect transistor having a source connected to said first overflow charge storing means, a reset gate connected to receive said clock signal $\phi$RST and a drain connected to a drain voltage source.

* * * * *